United States Patent
Bae et al.

(10) Patent No.: US 12,277,045 B2
(45) Date of Patent: Apr. 15, 2025

(54) TIMED PATTERN BASED ANALYSIS OF COLLABORATION FAILURES IN PLATOONING SYSTEM OF SYSTEMS

(71) Applicant: Korea Advanced Institute Of Science And Technology, Daejeon (KR)

(72) Inventors: Doo-Hwan Bae, Daejeon (KR); Sangwon Hyun, Daejeon (KR); Jiyoung Song, Daejeon (KR); Eun Kyoung Jee, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 50 days.

(21) Appl. No.: 18/319,875

(22) Filed: May 18, 2023

(65) Prior Publication Data
US 2024/0176717 A1    May 30, 2024

(30) Foreign Application Priority Data
Nov. 25, 2022  (KR) .................. 10-2022-0160655

(51) Int. Cl.
*G06F 11/28*        (2006.01)

(52) U.S. Cl.
CPC .................. *G06F 11/28* (2013.01)

(58) Field of Classification Search
CPC ...... G06F 11/28; G06F 11/3466; G06F 9/546; G06F 11/3072; G06F 11/3419; G06F 11/3457; G06F 11/3664
USPC .......................................... 714/39
See application file for complete search history.

(56) References Cited

U.S. PATENT DOCUMENTS

2004/0111639 A1*  6/2004  Schwartz .............. H04L 63/105
                                                                726/1

* cited by examiner

*Primary Examiner* — Yair Leibovich
(74) *Attorney, Agent, or Firm* — Nixon Peabody LLP

(57) ABSTRACT

Disclosed is a method for timed pattern-based collaboration failure analysis in a platooning system-of-systems (SoS). A method for timed pattern-based collaboration failure analysis in a SoS performed by a computer device may include extracting an interaction collaboration failure pattern through a collaboration failure analysis in an interaction model generated from an interaction log executed in the SoS; and localizing a fault of an interaction bug from the extracted interaction collaboration failure pattern.

17 Claims, 7 Drawing Sheets

FIG. 6

| | | | | | | |
|---|---|---|---|---|---|---|
| 1 | 53.03: MERGE_REQ | from v6 to v5 | | 1 | 85.00: LEAVE_REQUEST | from v2 to v1 |
| 2 | 53.53: MERGE_REQ | from v6 to v5 | | 2 | 83.02: SPLIT_REQ | from v1 to v3 |
| 3 | 54.03: MERGE_REQ | from v6 to v5 | | 3 | 85.08: SPLIT_ACCEPT | from v3 to v1 |
| 4 | 54.06: MERGE_ACCEPT | from v6 to v6 | | 4 | 85.18: CHANGE_PL | from v1 to v3 |
| 5 | 54.53: MERGE_REQ | from v6 to v5 | | 5 | 85.43: CHANGE_Tg | from v1 to multi |
| 6 | 54.06: MERGE_ACCEPT | from v5 to v6 | | 6 | 85.43: SPLIT_DONE | from v1 to v3 |
| 7 | 54.53: MERGE_DONE | from v6 to v5 | | 7 | 85.46: MERGE_REQ | from v5 to v3 |
| 8 | 85.43: SPLIT_DONE | from v1 to v3 | | 8 | 88.24: SPLIT_REQ | from v2 to v1 |
| 9 | 85.46: MERGE_REQ | from v5 to v3 | | 9 | 89.46: MERGE_REQ | from v5 to v3 |
| 10 | 85.96: MERGE_REQ | from v5 to v3 | | 10 | 90.46: MERGE_REQ | from v5 to v3 |
| 11 | 86.46: MERGE_REQ | from v5 to v3 | | | | |
| 12 | 86.96: MERGE_REQ | from v5 to v3 | | | | |
| 13 | 87.46: MERGE_REQ | from v5 to v3 | | | | |

Extracted Pattern 1 from LCMS($p_k^0$, $q_n^0$)      Extracted Pattern 2 from LCMS($p_k^0$, $q_n^{60}$)

TIMED PATTERN BASED ANALYSIS OF COLLABORATION FAILURES IN PLATOONING SYSTEM OF SYSTEMS

CROSS-REFERENCE TO RELATED APPLICATION(S)

This application claims the priority benefit of Korean Patent Application No. 10-2022-0160655, filed on Nov. 25, 2022, in the Korean Intellectual Property Office, the disclosure of which is incorporated herein by reference.

BACKGROUND

1. Field of the Invention

Example embodiments of the following description relate to technology for analyzing data failures.

2. Description of the Related Art

A system-of-systems (SoS) that is a large complexity system refers to a system that allows heterogeneous systems to achieve goals unsolvable with a single system through collaboration. Representative examples of the SoS include a smart home, a smart plant, and an intelligent transportation system. Such large-scale systems achieve goals by performing a specific operation through close interaction between constituent systems (CSs). For example, a platooning system that is a type of the intelligent transportation system performs operations, such as leave, merge, and split, and maintains a platoon and allows vehicles to join or leave the platoon by exchanging messages 17 times on average.

The interaction-based nature of the SoS may lead to a system collaboration failure by an interaction bug that has not been found frequently before. However, there is no technology suitable for efficiently extracting and providing information required to the interaction bug. Also, high-level background knowledge of the system itself is required to infer the interaction bug from the system failure. In particular, the existing studies have some limitations in analyzing interactive collaboration failures of the SoS, such as (1) lack of technical capacity for processing interaction log analysis, (2) absence of a clustering technique that considers cascading failures, and (3) absence of a technique capable of localizing a code fault from an extracted failure pattern.

SUMMARY

Example embodiments may provide TImed Message pattern Extraction-Longest Common Subsequence (TIME-LCS) pattern mining for accurately extracting an interaction collaboration failure pattern in consideration of multidimensional and temporal features.

Example embodiments may classify all interaction collaboration failure patterns generated during execution of a SoS through time overlapping clustering.

Example embodiments may calculate suspiciousness of a collaboration protocol code by focusing on the sequential property of protocol code execution and may localize a fault from an interaction collaboration failure pattern.

According to an aspect of example embodiments, there is provided a method for timed pattern-based collaboration failure analysis in a SoS performed by a computer device, the method including extracting an interaction collaboration failure pattern through a collaboration failure analysis in an interaction model generated from an interaction log executed in the SoS; and localizing a fault of an interaction bug from the extracted interaction collaboration failure pattern.

The extracting may include verifying whether the interaction log satisfies a goal property using the interaction log executed in the SoS and a passed tag and a failed tag of the interaction log.

The extracting may include generating a message-based message sequence in the interaction log that includes the failed tag.

The SoS may include a platooning SoS, and the extracting may include representing an interaction log between constituent systems (CSs) as a communication message sequence between vehicles through an interaction model generated in the platooning SoS.

The extracting may include extracting an interaction collaboration failure pattern of the SoS with a method of extracting a longest common subsequence (LCS) through collaboration failure analysis based on a TImed Message pattern Extraction-Longest Common Subsequence (TIME-LCS) function that considers multidimensional and temporal features of the interaction log.

The extracting may include classifying the extracted interaction collaboration failure patterns into a plurality of common patterns by grouping interaction logs each including a failed log through time overlapping clustering.

The extracting may include calculating similarity between message sequences based on the TIME-LCS function.

The extracting may include calculating the similarity through a length of a common subsequence extracted by the TIME-LCS function between message sequences using a message sequence of an existing cluster and a single message sequence in the case of a cluster that includes the single message sequence.

The extracting may include calculating a common subsequence-based sequence similarity using a common subsequence pattern of an existing cluster and a single message sequence in the case of a cluster that includes two or more message sequences.

The extracting may include determining whether to add a message sequence to an existing cluster or whether to generate a new cluster using thresholds for calculating the similarity and metrics for calculating the similarity.

The extracting may include generating the new cluster with the message sequence if there is no cluster similar enough to add the message sequence.

The extracting may include adding the message sequence to the existing cluster if the message sequence is similar enough to be added to the existing cluster and updating a common subsequence pattern of the existing cluster using the message sequence.

The extracting may include repeating a time overlapping clustering process until there is no message sequence and returning a set of clustered logs with a corresponding interaction collaboration failure pattern.

The localizing may include localizing a suspicious code for a SoS collaboration protocol code from the extracted interaction collaboration failure pattern.

The localizing may include localizing the suspicious code using a code coverage calculating method for a CS-level operation.

The localizing may include building a code coverage set that records executed code lines for each operation by executing a CS-level operation and measuring code coverage.

The localizing may include ranking collaboration protocol codes according to suspiciousness of causing failures using the built code coverage set.

The localizing may include prioritizing a most repeatedly executed code statement in a sequence of CS-level operations related to interaction collaboration failure patterns using a SeqOverlap method that calculates suspiciousness of causing failures based on the number of sequential overlaps.

According to an aspect of example embodiments, there is provided a non-transitory computer-readable recording medium storing instructions that, when executed by a processor, cause the processor to perform a method for timed pattern-based collaboration failure analysis in a SoS performed by a computer device, the method including extracting an interaction collaboration failure pattern through a collaboration failure analysis in an interaction model generated from an interaction log executed in the SoS; and localizing a fault of an interaction bug from the extracted interaction collaboration failure pattern.

According to an aspect of example embodiments, there is provided a computer device including at least one processor configured to execute computer-readable instructions included in a memory. The at least one processor is configured to extract an interaction collaboration failure pattern through a collaboration failure analysis in an interaction model generated from an interaction log executed in a SoS, and to localize a fault of an interaction bug from the extracted interaction collaboration failure pattern.

According to some example embodiments, it is possible to reduce human and time resources required to solve an interaction bug not predicted in a large complexity system.

According to some example embodiments, it is possible to generate a most accurate interaction collaboration failure pattern from a platooning interaction log, to derive significantly high overlapping clustering precision when considering cascading failures, and to achieve a higher efficacy of debugging cost reduction with an interaction collaboration failure fault localization algorithm compared with a spectrum-based fault localization method.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 6 illustrates longest common subsequence (LCS) patterns extracted from the same message sequence with different time windows according to an example embodiment.

DETAILED DESCRIPTION

Figure 1:
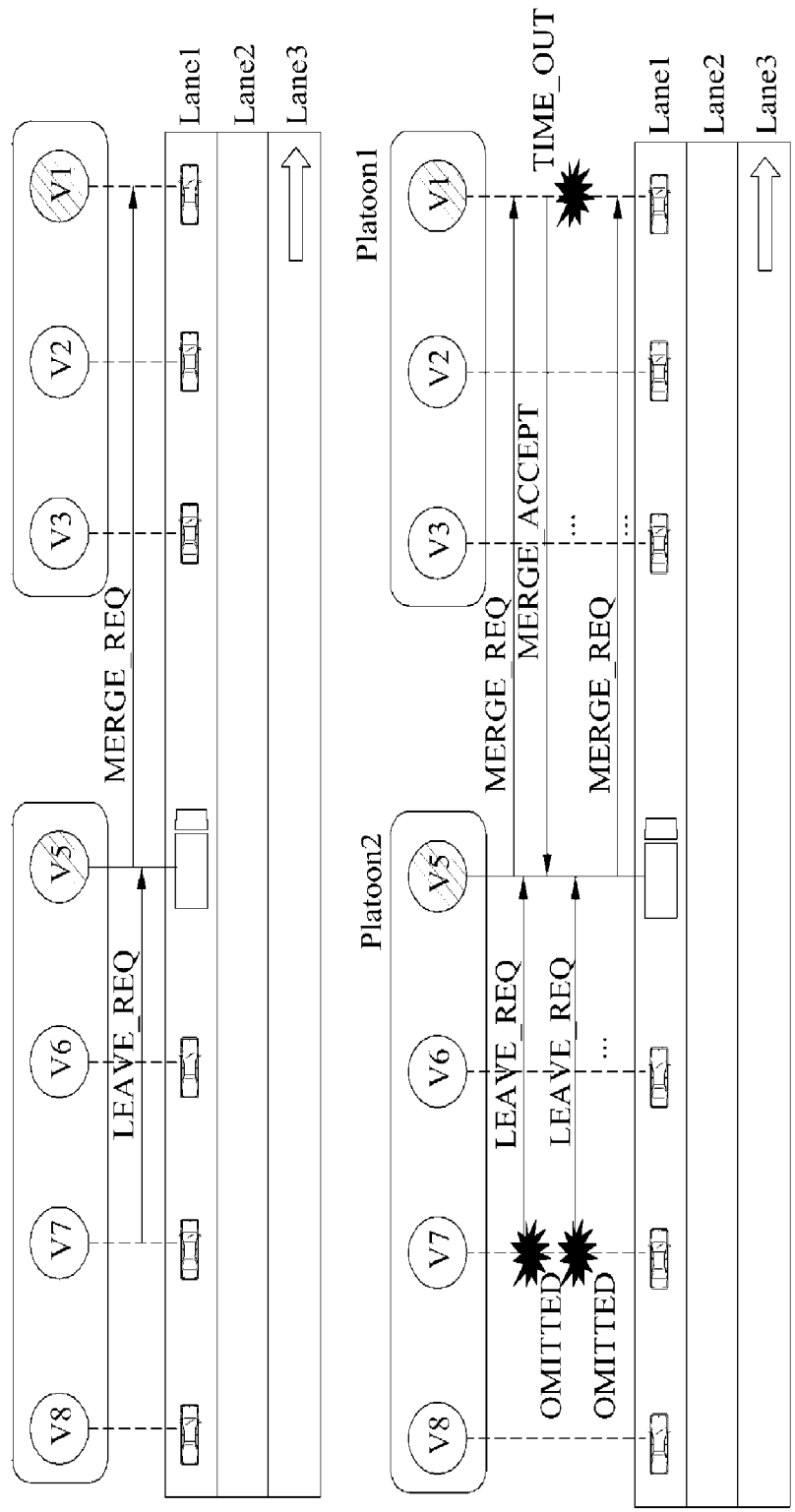
FIG. 1 illustrates a deadlock-like failure of a platooning operation found in a simulation using a simulator according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments are described with reference to the accompanying drawings.

FIG. 1 illustrates a deadlock-like failure of a platooning operation found in a simulation using a simulator according to an example embodiment.

A scenario has two platoons, that is, Platoon 1 with a size of three and Platoon 2 with a size of four. Here, V1 and V5 are marked as leaders of the respective platoons. This failure occurs due to simultaneous requests of merge from V5 and leave from V7. In this situation, since V5 is in a merge operation, V5 continuously ignores a leave operation from V7. Also, due to communication between V5 and V7, a wait time form merge is exceeded and thus, the merge operation is not properly executed in V5. The failure caused by such complex interaction is a significant challenge to achieving a platooning gool and may lead to a serious collision.

Figure 2:
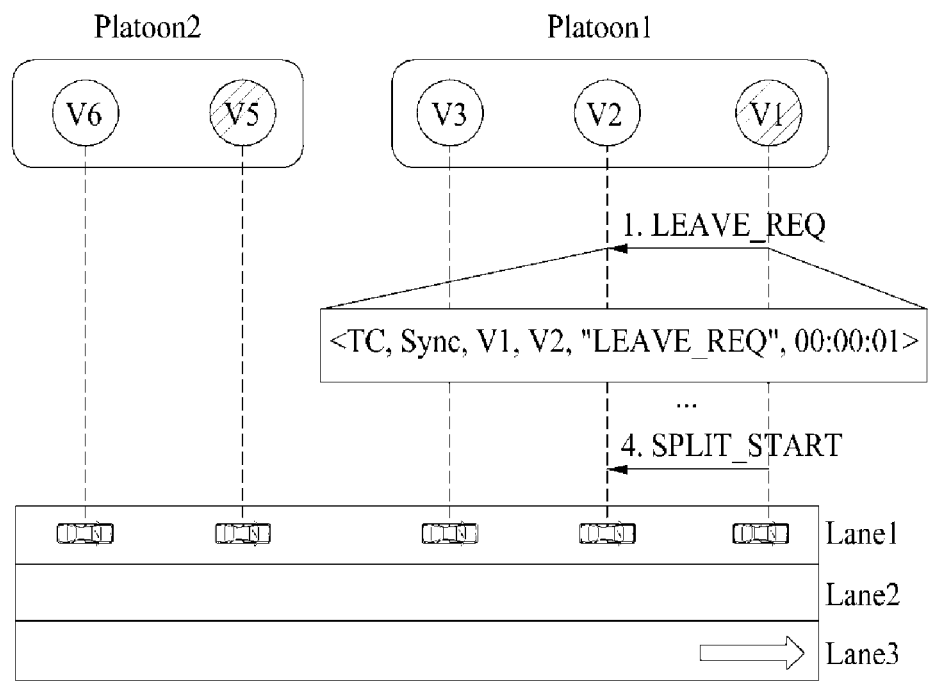
FIG. 2 illustrates a sequence of communication messages between vehicles in a platooning system-of-systems (SoS) according to an example embodiment.

FIG. 2 illustrates a sequence of communication messages between vehicles in a platooning SoS according to an example embodiment.

Initially, a longest common subsequence (LCS) algorithm and an interaction model for an interaction log executed in a SoS are described. The LCS algorithm finds a longest subsequence that two strings have in common. Let m, n∈ $\mathbb{N} \geq 0$, $x_m$, $y_n \in$ Char, $s_m = x_1, x_2, x_3, \ldots, x_m$, and $s_n = y_1, y_2, y_3, \ldots, y_n$ be strings having lengths m and n, respectively. The function LCS: String×String→String maps two input strings to a longest common subsequence involved in both strings. The LCS function may be defined as follows.

$$LCS(s_m, s_n) = \begin{cases} \phi, & \text{if } m = 0 \text{ or } n = 0 \\ LCS(s_{m-1}, s_{n-1}) \otimes x_m, & \text{if } x_m = y_a \\ maxLenS(LCS(s_m, s_{n-1}), & \text{otherwise} \\ LCS(s_{m-1}, s_n)) \end{cases}$$

The function maxLenS:String×String→String selects a longer string between two input strings. If the length of two strings is zero, the LCS function outputs an empty string. Here, an operator $\oplus$ implies concatenation of operands. When two input strings have a common character, the function recursively concatenates the character to LCS($s_{m-1}$, $s_{n-1}$).

Interaction logs of constituent systems (CSs) may be focused to comprehensively analyze collaboration failures of the SoS. The interaction model of the SoS may represent the interaction logs as a message sequence between the CSs. The message and the message sequence may be defined as follows:

Msg ∋ msg=(continuity, synchronization, sender, receiver, content, time),

M ∋ $m_n$=$msg_1$, $msg_2$, $msg_3$, ..., $msg_n$,

Here, $m_n$ denotes a finite sequence of messages with length n. Each $msg_i$ in the sequence is a tuple that includes continuity, synchronization, sender, receiver, content, and time. For example, FIG. 2 illustrates a sequence of communication messages between vehicles in a platooning SoS. In the example scenario, since V1 desires to leave Platoon 1, V1 sends a message to V2. The message, $msg_1$, sent to V2 is (TC, Sync, V1, V2, "LEAVE_REQ", 00:00:01), which represents temporary (TC) and synchronous (Sync) communication from V1 to V2 with LEAVE_REQ command at 00:00:01. A message sequence from LEAVE_REQ to SPLIT_START may be written as $m_4$=$msg_1$, $msg_2$, $msg_3$, $msg_4$. As described above, a time window of the interaction log in pattern mining may be considered. Therefore, $m_n$ is expanded to $m_n^t$. Here, t denotes an onset time of a time window.

Figure 3:
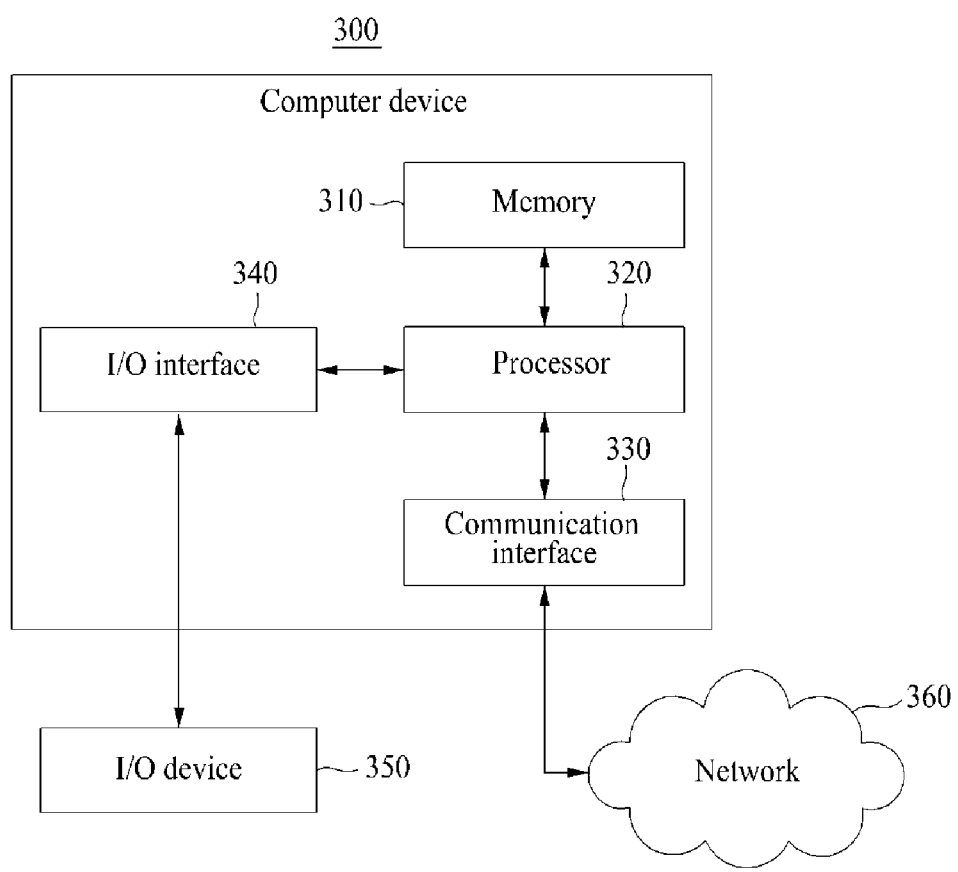
FIG. 3 is a diagram illustrating a configuration of a computer device according to an example embodiment.

FIG. 3 is a diagram illustrating a configuration of a computer device according to an example embodiment.

Referring to FIG. 3, a computer device 300 may include a memory 310, a processor 320, a communication interface 330, and an input/output (I/O) interface 340. The memory 310 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 300 as a permanent storage device separate from the memory 310. Also, an OS and at least one program code may be stored in the memory 310. Such software components may be loaded to the memory 310 from another non-transitory computer-readable recording medium separate from the memory 310. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 310 through the communication interface 330, instead of the non-transitory computer-readable recording medium. For example, the software components may be loaded to the memory 310 of the computer device 300 based on a computer program installed by files received over a network 370.

The processor 320 may be configured to process instructions of a computer program by performing basic arithmetic operations, logic operations, and I/O operations. The computer-readable instructions may be provided by the memory 310 or the communication interface 330 to the processor 320. For example, the processor 320 may be configured to execute received instructions in response to a program code stored in a storage device, such as the memory 310.

The communication interface 330 may provide a function for communication between the computer device 300 and another apparatus, for example, the aforementioned storage devices, over the network 370. For example, the processor 320 of the computer device 300 may forward a request or an instruction created based on a program code stored in the storage device such as the memory 310, data, and a file, to other apparatuses over the network 370 under control of the communication interface 330. Inversely, a signal, an instruction, data, a file, etc., from another apparatus may be received at the computer device 300 through the communication interface 330 of the computer device 300. For example, a signal, an instruction, data, etc., received through the communication interface 330 may be forwarded to the processor 320 or the memory 310, and a file, etc., may be stored in a storage medium, for example, the permanent storage device, further includable in the computer device 300.

The I/O interface 340 may be a device used for interfacing with an I/O device 350. For example, an input device may include a device, such as a microphone, a keyboard, a mouse, etc., and an output device may include a device, such as a display, a speaker, etc. As another example, the I/O interface 340 may be a device for interfacing with an apparatus in which an input function and an output function are integrated into a single function, such as a touchscreen. The I/O device 350 may be configured as a single apparatus with the computer device 300.

Also, according to other example embodiments, the computer device 300 may include a greater or smaller number of components than the number of components of FIG. 3. However, there is no need to clearly illustrate most conventional components. For example, the computer device 300 may be configured to include at least a portion of the I/O device 350 or may further include other components, such as a transceiver and a database.

Hereinafter, example embodiments of a timed pattern-based collaboration failure analysis method and apparatus in a SoS will be described.

The processor 320 of the computer device 320 may be implemented as a component to perform the timed pattern-based collaboration failure analysis method in the SoS. Depending on example embodiments, the components of the processor 320 may be selectively included in or excluded from the processor 320. Also, depending on example embodiments, the components of the processor 320 may be separated or merged for representations of functions of the processor 320.

The processor 320 and the components of the processor 320 may control the computer device 300 to perform operations included in the following timed pattern-based collaboration failure analysis method in the SoS. For example, the processor 320 and the components of the processor 320 may be configured to execute an instruction according to a code of at least one program and a code of an OS included in the memory 310.

Here, the components of the processor 320 may be representations of different functions performed by the processor 320 in response to an instruction provided from a program code stored in the computer device 300.

The processor 320 may read a necessary instruction from the memory 310 to which instructions related to control of the computer device 300 are loaded. In this case, the read instruction may include an instruction for controlling the processor 320 to perform the following operations.

Operations included in the timed pattern-based collaboration failure analysis method in the SoS may be performed in order different from illustrated order. A portion of the operations may be omitted or an additional process may be further included.

Figure 4:
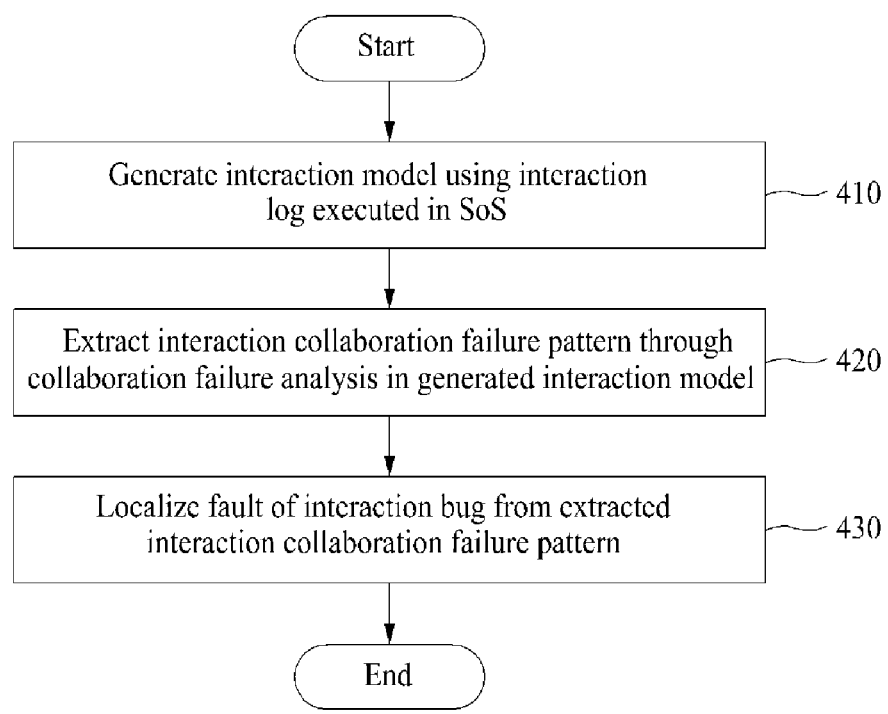
FIG. 4 is a flowchart illustrating a method for a timed pattern-based collaboration failure analysis in a SoS according to an example embodiment.

FIG. 4 is a flowchart illustrating a method for timed pattern-based collaboration failure analysis in a SoS according to an example embodiment.

In operation 410, the processor 320 may generate an interaction model using an interaction log executed in a SoS. The processor 320 may verify whether the interaction log satisfies a goal property using the interaction log executed in the SoS and a passed tag and a failed tag of the interaction log. The processor 320 may generate a message-based message sequence in the interaction log that includes the failed tag. The processor 320 may represent an interaction log between CSs as a sequence of communication messages between vehicles through an interaction model generated in a platooning SoS.

In operation 420, the processor 320 may extract an interaction collaboration failure pattern through a collaboration failure analysis in the generated interaction model. The processor 320 may extract an interaction collaboration failure pattern of the SoS with a method of extracting an LCS through collaboration failure analysis based on a TImed Message pattern Extraction-Longest Common Subsequence (TIME-LCS) function that considers multidimensional and temporal features of the interaction log. The processor 320 may classify the extracted interaction collaboration failure patterns into a plurality of common patterns by grouping interaction logs each including a failed tag through time overlapping clustering. The processor 320 may calculate similarity between message sequences based on the TIME-LCS function. For a cluster that includes a single message sequence, the processor 320 may calculate the similarity through a length of a common subsequence extracted by the TIME-LCS function between message sequences using a message sequence of an existing cluster and the single message sequence. For a cluster that includes two or more message sequences, the processor 320 may calculate a common subsequence-based sequence similarity using a common subsequence pattern of an existing cluster and a single message sequence. The processor 320 may determine whether to add a message sequence to the existing cluster or whether to generate a new cluster using thresholds for calculating the similarity and metrics for calculating the similarity. If there is no cluster similar enough to add the message sequence, the processor 320 may generate the new cluster with the message sequence. If the message sequence is similar enough to be added to the existing cluster, the processor 320 may add the message sequence to the existing cluster and may update a common subsequence pattern of the existing cluster using the message sequence. The processor 320 may repeat a time overlapping clustering process until there is no message sequence and may return a set of clustered logs with a corresponding interaction collaboration failure pattern.

In operation 430, the processor 320 may localize a fault of an interaction bug from the extracted interaction collaboration failure pattern. The processor 320 may localize a suspicious code for a SoS collaboration protocol code from the extracted interaction collaboration failure pattern. The processor 320 may localize the suspicious code using a code coverage calculation method for CS-level operations. The processor 320 may build a code coverage set that records executed code lines for each operation by executing each CS-level operation and measuring code coverage. The processor 320 may rank collaboration protocol codes according to suspiciousness of causing failures using the built code coverage set. The processor 320 may prioritize a most repeatedly executed code statement in a sequence of CS-level operations related to the interaction collaboration failure patterns using a SeqOverlap method that calculates the suspiciousness of causing failures based on the number of sequential overlaps.

Figure 5:
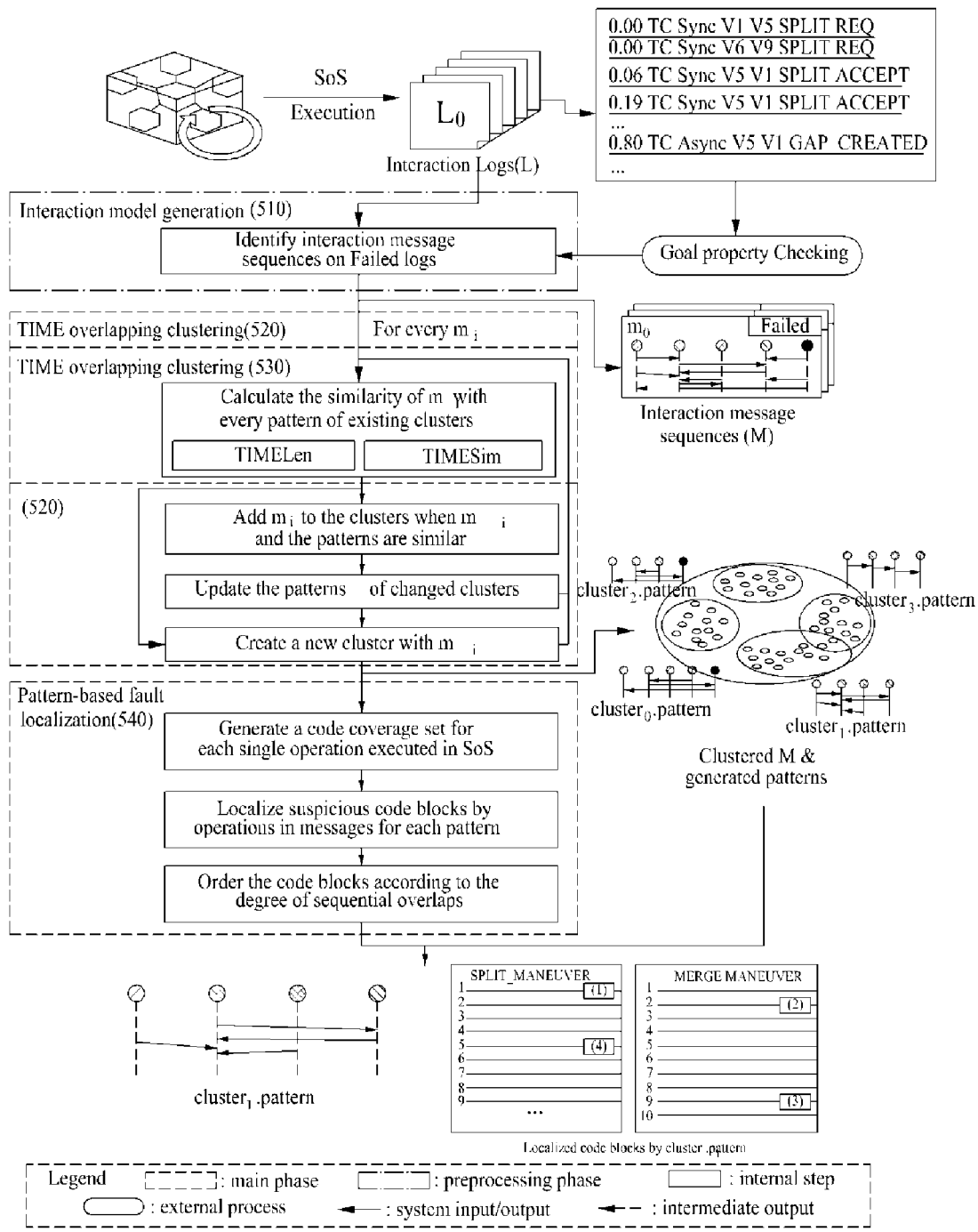
FIG. 5 illustrates a collaboration failure analysis operation according to an example embodiment.

FIG. 5 illustrates a collaboration failure analysis operation according to an example embodiment.

A computer device may analyze a TIME-LCS pattern-based collaboration failure with an approach that includes three techniques; TIME-LCS pattern mining 530, TIME overlapping clustering 520, and pattern-based fault localization 540. The computer device may define a TIME-LCS algorithm for extracting interaction collaboration failure patterns of a SoS by covering a multidimensional structure of interaction logs. Also, the TIME-LCS algorithm considers a temporal feature of interaction to increase accuracy of pattern mining. The computer device may classify and extract a plurality of interaction collaboration failure patterns through time overlapping clustering. In time overlapping clustering, the interaction collaboration failure pattern may be used as the centroid of each group. Therefore, metrics required for clustering may be defined based on the TIME-LCS algorithm. The computer device may localize a root cause of collaboration failure based on the interaction collaboration failure pattern.

The computer device may use two main inputs. The computer device may verify whether the interaction log satisfies a specific goal property through interaction logs of the SoS and passed/failed tags of each log. As described above with reference to FIG. 2, the computer device follows an interaction model format of the SoS. Therefore, in a preprocessing phase, the computer device may abstract all message-based interactions on each failed log and may return an interaction message sequence (M). For example, in an example shown at a top of FIG. 5, a first message of an interaction log includes time (0.00), continuity (TC), synchronization (Sync), sender (Leader), receiver (Follower), and contents (SPLIT REQ). Here, a concrete instance ID for sender and receiver, such as V1 or V5, is not used, but an ID for a role of a CS (i.e., leader or follower) in the SoS is abstracted to extract patterns that occur in different vehicles and time zones.

The computer device may extract an interaction collaboration failure pattern through TIME-LCS pattern mining 530 by using an interaction message sequence (M) as input. The TIME-LCS pattern mining algorithm focuses on covering multidimensional and temporal features of interaction logs not to cause dimensional and temporal features in pattern mining.

Initially, to deal with multidimensionality, a string-based LCS function of Equation 1 may be extended to a longest common message subsequence (LCMS) function based on definition of message sequence $m_n$.

Here, the function LCMS: $M \times M \rightarrow M$ that maps two input message sequences, $p_k$ and $q_n$, to a longest common message sequence may be defined as follows.

Equation 2

$$LCMS(p_k, q_n) \triangleq \begin{cases} \phi, & \text{if } k = 0 \text{ or } n = 0 \\ LCMS(p_{k-1}, q_{n-1}) \otimes msg_k^p, & \text{if } MCT(msg_k^p, msg_n^q) \\ maxLenM(LCMS(p_k, q_{n-1}) \\ , LCMS(p_{k-1}, q_n)) & \text{otherwise} \end{cases}$$

The function maxLenM $M \times M \rightarrow M$ selects a longest message sequence between two inputs. In Equation 1, comparison between two characters forming the strings is self-explanatory. However, a special function is required to determine identity of two input message sequences. Therefore, a message comparison with time function MCT capable of verifying identify of the sequence of two input message sequences may be defined. Here, it is assumed $pre_p$, $pre_q \in \mathbb{N} \geq 0$ that denotes a previously matched ids in $p_k$ and $q_n$, that is, two input message sequences, respectively. The function MCT: $Msg \times Msg \rightarrow \mathbb{B}$ may map two input message sequences to Boolean value of message identity as follows.

Equation 3

The MCT function includes not only multidimensional features but also temporal features of interactions. The MCT function compares delivery intervals of two input message sequences and excludes a situation in which a certain subsequence occurs at a significantly different time interval. It is assumed that $msg_{10}^p$ includes a 1-s interval with its previously matched message and $msg_{20}^q$ includes a 20-s interval. Although all other values of $msg_{10}^p$ and $msg_{20}^q$ are the same, determining that two input messages having significantly different delivery intervals are identical may adversely affect accuracy of extracted patterns. Therefore, a process of verifying message identity may be classified into two cases. If no message is matched during LCS pattern extraction, the computer device verifies only identity of message contents, such as sender, content, and receiver. Otherwise, the computer device additionally verifies whether a difference in delivery interval between input message sequences is within the range of a delay threshold.

The proposed LCMS function in Equation 2 and Equation 3 may extract LCS patterns of interaction messages between any two message sequences. However, it is difficult to conclude that the proposed LCMS function always extracts a most "critical" message sequence accurately including information required to identify a root cause of failure. The term "critical" indicates quality of information owned by a specific interaction collaboration failure pattern regarding a collaboration failure. Since the LCS-based algorithm starts from a "firstly matched" instance, an LCS pattern may include a completely meaningless portion prior to a critical point.

FIG. 6 illustrates LCS patterns extracted from the same message sequence with different time windows according to an example embodiment.

FIG. 6 illustrates two example LCS patterns extracted from the same message sequence with different time windows. For example, pattern 1 starts from 53.03 sec and includes repetitive MERGE_REQ messages and a few other messages. Pattern 2 starts from 85.00 sec and includes various messages, such as LEAVE_REQ, SPLIT_REQ, and MERGE_REQ, between V1, V2, V3, and V5. Pattern 2 provides more critical understanding of a failure that V5 repetitively requests merge to V3 when V3 is still in a leave operation between V2 and V1.

To accurately extract interaction collaboration failure patterns, the computer device defines an algorithm that extracts LCS patterns according to several time windows of input message sequences and selects a most "critical" LCS from among LCSs. Let $t_1, t_2 \in T = \{t \in \mathbb{R} \geq 0 | t \text{ is a time window starting time}\}$, M be a set of message sequences, and n, $k \in \mathbb{N}$ be a length of message sequences. Sub-message sequences starting from $t_1$ and $t_2$ may be defined as follows.

$$p_k^{t_1} \triangleq msg_1^p, msp_2^p, msg_3^p, \ldots, msg_k^p$$

$$q_n^{t_2} \triangleq msg_1^q, mag_2^q, msg_3^q, \ldots, msg_n^q$$

To properly select the most "critical" LCS from among the selected LCSs, a parameter required to evaluate quality of a corresponding LCS may be defined as the number of content types in the LCS and lengths of content types. It is assumed that, if a corresponding LCS includes more content types and has a length less than other LCSs, the corresponding LCS is more "critical" than the other LCSs and thus includes more informative interaction collaboration failure pattern sequences with fewer redundant messages. This definition is based on the priority among the context and symptoms of failures. The context denotes condition and execution flows in which failures occur. The symptom denotes a result of failure and is frequently used in fault detection technique as a failure indicator. However, the computer device focuses on analysis of collaboration failures, particularly, identifying root causes. During this analysis process, the failure occurrence context provides more meaningful knowledge to help understanding the root causes. Therefore, the computer device prioritizes LCSs with various types of interaction contents that provide more contextual information.

Let k, n $\in \mathbb{N}$. The aforementioned methods to T-LCS and TIME-LCS are defined as follows.

$$T - LCS(p_k, q_n) \triangleq \bigcup_{t_2, t_2 \in T} LCMS(p_k^{t_1}, q_n^{t_2})$$

Equation 4

$$\text{TIME} - LCS(p_k, q_n) \triangleq \underset{m \in T-LCS(p_k, q_n)}{\arg\max} NumContentTypes(m),$$

Equation 5

Here, the function NumContentTypes: $M \rightarrow \mathbb{N}$ maps an input LCS to the number of independent content types included in messages that belong to the given LCS. When the algorithm calculates T-LCS, the algorithm generates a set of LCSs each having sub-message sequence of $p_k$ and $q_n$ by a discrete time window starting at $t_1$ and $t_2$ in T. As described above, TIME-LCS selects the number of LCSs corresponding to the number of content types from among T-LCS in Equation 5. If the number of content types is the same, the lengths of LCSs are used as a tie-breaking rule.

The computer device may effectively group similar failed logs and may extract a common pattern of interaction collaboration failures based on a TIME-LCS algorithm through time overlapping clustering. Since it is assumed that overlapping clustering is required to extract multiple patterns from $m_i$ that is a single message sequence, $m_i$ is added to a plurality of clusters if $m_i$ is regarded to have a plurality of failure patterns simultaneously.

The computer device may define two similarity calculation metrics (i.e., TIMELen and TIMESim) based on the TIME-LCS function. The reason for suggesting two metrics is that LCS-based algorithms are basically pair-wise algorithms. Therefore, the computer device may divide cases into (a) a cluster with a single element (i.e., $m_i$) and (b) a cluster with two or more elements and may use different similarity metrics for the respective cases. In the case of (a) the cluster with the single element (i.e., $m_i$), the number of elements capable of generating an LCS pattern for the cluster is insufficient and thus, the computer device may calculate the similarity using a message sequence in an existing $cluster_j$ and the given $m_i$. For example, $m_0$ that is a first message sequence forms $cluster_0$ that is a new cluster at all times. $m_1$ that is a second given message sequence is compared to $m_0$ of $cluster_0$. Therefore, in the case of (a) the cluster with the single element (i.e., $m_i$), the similarity between two message sequences is defined as an LCS length between the message sequences.

$$TIMELen \triangleq len(TIME-LCS(m_{cluster_j}, m_i)) \qquad \text{Equation 6}$$

$$TIMESim \triangleq \frac{len(TIME-LCS(cluster_j.\text{pattern}, m_i))}{len(cluster_j.\text{pattern})} \qquad \text{Equation 7}$$

In Equation 6, $m_{cluster_j}$ denotes a single message sequence located in $cluster_j$ and $m_i$ denotes a message sequence given as input. A TIMELen similarity value becomes a length of an LCS extracted from the TIME-LCS function. Otherwise, when two or more elements are present in a cluster, TIMEsim of Equation 7 is applied. In the case of (b) the cluster with two or more elements, subjects of TIMESim include $cluster_j$.pattern that is an LCS pattern in an existing cluster and a given message sequence $m_i$. The computer device calculates LCS-based sequence similarity between $m_i$ and $cluster_j$.pattern through the TIMESim metric.

Using two metrics with threshold values, len_threshold and similarity_threshold, the computer device determines whether to add $m_i$ to the existing cluster or to generate a new cluster. For example, if similarity_threshold is 0.8 and a TIMESim value is 0.75 for $m_{10}$ and $cluster_3$, $m_{10}$ is not assigned to $cluster_3$. Therefore, a plurality of patterns may be simultaneously extracted from $m_i$. If $m_i$ is similar enough to be added to $cluster_j$, the computer device may add $m_i$ to $cluster_j$ and may update $cluster_j$.pattern that is the LCS pattern of the existing cluster using $m_i$. If there is no cluster that is similar enough to add $m_i$, the computer device may generate a new cluster having $m_i$. This clustering process is repeated until no $m_i$ is present and finally returns a set of clustered logs with a corresponding interaction collaboration failure pattern.

Figure 7:
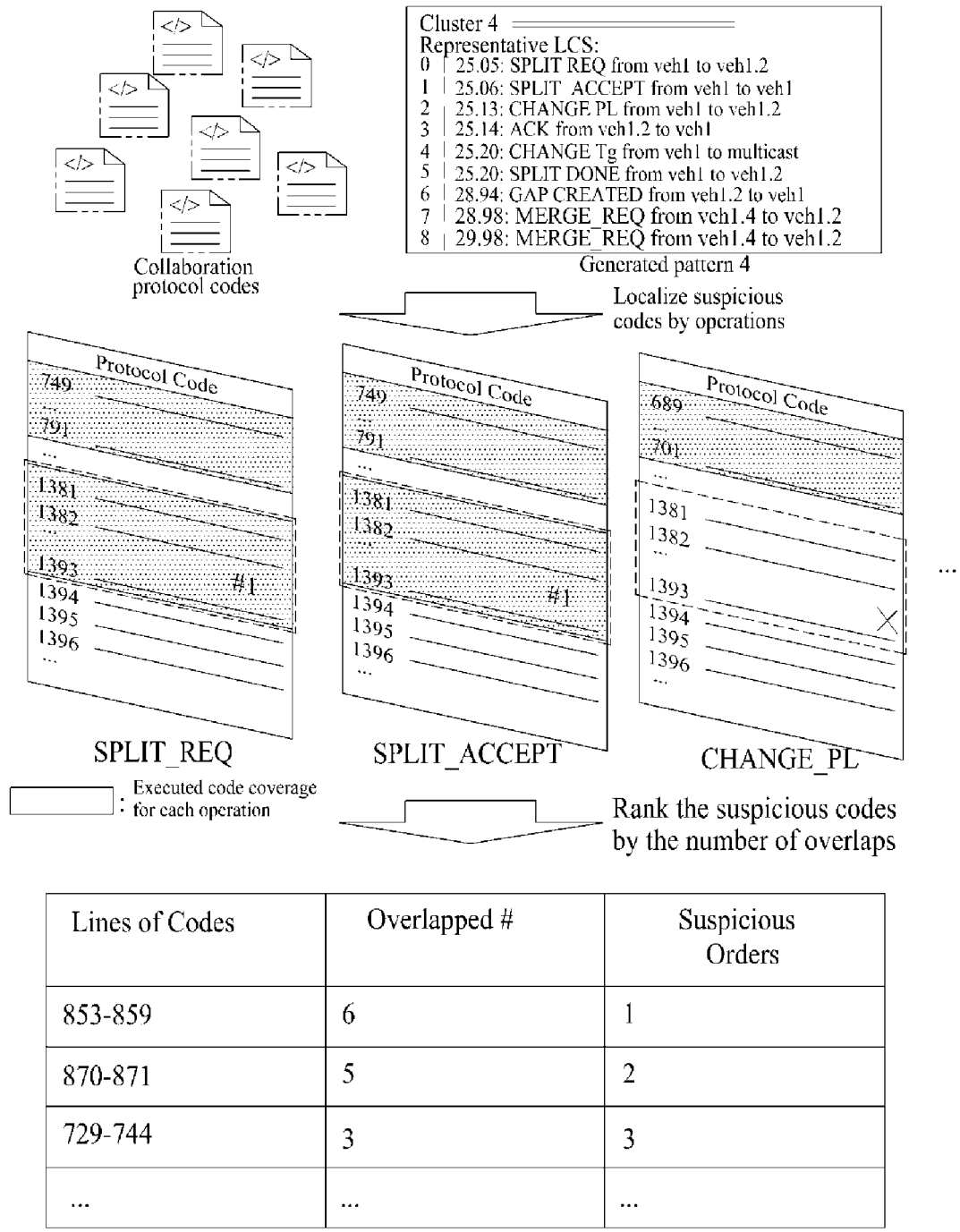
FIG. 7 illustrates an example of explaining an operation of performing pattern-based fault localization according to an example embodiment.

FIG. 7 illustrates an example of explaining an operation of performing pattern-based fault localization according to an example embodiment.

Based on a pattern generated based on an interaction collaboration failure pattern, the computer device proposes a suspicious code localization technique for a SoS collaboration protocol code that may significantly reduce cost required to localize a root cause of a collaboration failure. A pattern includes a communication message sequence involving a CS-level operation as its contents. The computer device infers a suspicious code by using a coverage calculation method for a CS-level operation, such as SPLIT_REQ and MERGE_REQ, through a localization technique. The computer device may build a code coverage set that records actually executed code lines for each operation by executing every single CS-level operation and by measuring code coverage. For example, lines 1381-1431 may be executed in a single execution of SPLIT_REQ.

The computer device ranks collaboration protocol codes according to suspiciousness of causing failures by using a code coverage set of each CS-level operation. There are numerous studies of spectrum-based fault localization (SBFL) for calculating the suspiciousness of code lines from the code execution coverage. However, an SBFL technique considers only operation coverage without considering the sequential execution order. Therefore, in the example embodiment, SeqOverlap that is a suspiciousness ranking method may be applied based on the number of sequential overlaps of codes. The SeqOverlap method is aimed to prioritize most repeatedly executed code statements in a sequence of CS-level operations in interaction collaboration failure patterns. For example, codes related to execution of SPLIT_REQ that is a first message at a top of FIG. 7 include lines 1381-1393. A next message is SPLIT_ACCEPT and related codes include lines 1381-1393. Therefore, lines 1381-1393 have two sequential overlaps. In this manner, the number of sequential overlaps may be calculated and code snippets illustrated in a bottom portion of FIG. 7 may be sorted. In this example, since the code snippet is frequently executed by MERGE_REQ and ACK in platooning simulation, lines 853-859 are ranked first.

According to an example embodiment, an experiment of applying the proposed approach (timed pattern-based collaboration failure analysis method in the SoS) to a PLT-Bench platooning SoS dataset may be conducted. By comparing the corresponding technology with techniques used in the existing system failure analysis and pattern mining using about 8,000 platooning system simulation logs, the performance of the proposed method in the example embodiment may be evaluated. The results acquired through the experiment shows that the proposed approach generates a most accurate interaction collaboration failure pattern from a platooning interaction log among existing pattern mining techniques, demonstrates significantly high overlapping clustering precision when considering cascading failures, and achieves higher efficacy (15% higher localization accuracy on average) of debugging cost reduction using an interaction collaboration failure fault localization algorithm compared with the SBFL method.

As described above, the SoS (large complex system) refers to a system that may achieve goals unachievable with a single system and may be used in various fields. Representative examples of the SoS include a smart home, a smart city, a smart plant, an intelligent transportation system, and a disaster response system. The proposed technology is conceived for general SoS and may be widely applied in that a primary input value required from the system is a system execution record. Recently, the proposed technology is mainly used under the name of cyber-physical SoS (CPSoS) in convergence with a cyber-physical system and is spreading to a wider range of fields.

Although a lot of efforts are required to generate such systems, huge cost is also required to solve faults present in the systems. The proposed method is expected to reduce human and temporal resources required to solve an interaction bug that is not predicted in a large complex system.

The apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for timed pattern-based collaboration failure analysis in a system-of-systems (SoS) performed by a computer device, the method comprising:
   extracting an interaction collaboration failure pattern through a collaboration failure analysis in an interaction model generated from an interaction log executed in the SoS; and
   localizing a fault of an interaction bug from the extracted interaction collaboration failure pattern,
   wherein the extracting comprises verifying whether the interaction log satisfies a goal property using the interaction log executed in the SoS and a passed tag and a failed tag of the interaction log,
   wherein the extracting comprises generating a message-based message sequence in the interaction log that includes the failed tag.

2. The method of claim 1, wherein the SoS includes a platooning SoS, and
   the extracting comprises representing an interaction log between constituent systems (CSs) as a communication message sequence between vehicles through an interaction model generated in the platooning SoS.

3. The method of claim 1, wherein the localizing comprises localizing a suspicious code for a SoS collaboration protocol code from the extracted interaction collaboration failure pattern.

4. The method of claim 3, wherein the the suspicious code is localized using a code coverage calculating method for a CS-level operation.

5. The method of claim 3, wherein the localizing of the suspicious code comprises building a code coverage set that records executed code lines for each operation by executing a CS-level operation and measuring code coverage.

6. The method of claim 5, wherein the localizing of the suspicious code comprises ranking collaboration protocol codes according to suspiciousness of causing failures using the built code coverage set.

7. The method of claim 5, wherein the localizing of the suspicious code comprises prioritizing a most repeatedly executed code statement in a sequence of CS-level operations related to interaction collaboration failure patterns using a SeqOverlap method that calculates suspiciousness of causing failures based on a number of sequential overlaps.

8. A method for timed pattern-based collaboration failure analysis in a system-of-systems (SoS) performed by a computer device, the method comprising:

extracting an interaction collaboration failure pattern through a collaboration failure analysis in an interaction model generated from an interaction log executed in the SoS; and localizing a fault of an interaction bug from the extracted interaction collaboration failure pattern, wherein the interaction collaboration failure pattern of the SoS is extracted based on an extraction of a longest common subsequence (LCS) through collaboration failure analysis based on a TImed Message pattern Extraction-Longest Common Subsequence (TIME-LCS) function that considers multidimensional and temporal features of the interaction log.

9. The method of claim 8, wherein the extracting comprises classifying the extracted interaction collaboration failure pattern into a plurality of common patterns by grouping interaction logs each including a failed log through time overlapping clustering.

10. The method of claim 9, wherein the extracting comprises calculating similarity between message sequences based on the TIME-LCS function.

11. The method of claim 10, wherein the extracting comprises calculating the similarity through a length of a common subsequence extracted by the TIME-LCS function between message sequences using a message sequence of an existing cluster and a single message sequence in case of a cluster that includes the single message sequence.

12. The method of claim 10, wherein the extracting comprises calculating a common subsequence-based sequence similarity using a common subsequence pattern of an existing cluster and a single message sequence in case of a cluster that includes two or more message sequences.

13. The method of claim 10, wherein the extracting comprises determining whether to add a message sequence to an existing cluster or whether to generate a new cluster using thresholds for calculating the similarity and metrics for calculating the similarity.

14. The method of claim 13, wherein the extracting comprises generating the new cluster with the message sequence if there is no cluster similar enough to add the message sequence.

15. The method of claim 13, wherein the extracting comprises adding the message sequence to the existing cluster if the message sequence is similar enough to be added to the existing cluster and updating a common subsequence pattern of the existing cluster using the message sequence.

16. The method of claim 13, wherein the extracting comprises repeating a time overlapping clustering process until there is no message sequence and returning a set of clustered logs with a corresponding interaction collaboration failure pattern.

17. A computer device comprising:
at least one processor configured to execute computer-readable instructions included in a memory,
wherein the at least one processor is configured to:
extract an interaction collaboration failure pattern through a collaboration failure analysis in an interaction model generated from an interaction log executed in a system-of-systems (SoS), and
localize a fault of an interaction bug from the extracted interaction collaboration failure pattern,
wherein the at least one processor is configured to extract the interaction collaboration failure pattern by
verifying whether the interaction log satisfies a goal property using the interaction log executed in the SoS and a passed tag and a failed tag of the interaction log, and
generating a message-based message sequence in the interaction log that includes the failed tag.

* * * * *